United States Patent
Wattenberg et al.

(10) Patent No.: US 6,889,362 B2
(45) Date of Patent: May 3, 2005

(54) USER INTERFACE FOR GRAPHICAL SPECIFICATION OF FUNCTIONS

(75) Inventors: Franklin A. Wattenberg, Washingtonville, NY (US); Todd M. Wostrel, Plano, TX (US); Craig L. Stewart, Rockwall, TX (US)

(73) Assignee: Texas Instruments Incorporated, Dallas, TX (US)

( * ) Notice: Subject to any disclaimer, the term of this patent is extended or adjusted under 35 U.S.C. 154(b) by 620 days.

(21) Appl. No.: 09/949,332

(22) Filed: Sep. 7, 2001

(65) Prior Publication Data

US 2002/0044160 A1 Apr. 18, 2002

Related U.S. Application Data

(60) Provisional application No. 60/231,351, filed on Sep. 8, 2000.

(51) Int. Cl.$^7$ .............................. G09G 5/00; G06F 13/00
(52) U.S. Cl. ........................ 715/700; 715/771; 708/174
(58) Field of Search ................................ 715/700, 764, 715/769, 771, 856, 961, 970; 708/174, 8, 131, 160, 270, 1, 100; 345/440, 440.1, 440.2, 764–769, 700, 702, 810, 835, 846, 856, 961, 964–966

(56) References Cited

U.S. PATENT DOCUMENTS

| | | | | |
|---|---|---|---|---|
| 5,245,559 A | * | 9/1993 | Lapeyre | 708/174 |
| 5,532,946 A | * | 7/1996 | Phipps et al. | 708/174 |
| 5,557,718 A | * | 9/1996 | Tsuneyoshi et al. | 345/440 |
| 5,712,656 A | * | 1/1998 | Ikeda et al. | 345/642 |
| 5,835,085 A | * | 11/1998 | Eick et al. | 345/853 |
| 6,081,819 A | * | 6/2000 | Ogino | 708/174 |
| 6,104,411 A | * | 8/2000 | Ito et al. | 345/440 |
| 6,133,924 A | * | 10/2000 | Ito et al. | 345/440 |
| 2002/0067357 A1 | * | 6/2002 | Hosea | 345/440 |
| 2002/0075227 A1 | * | 6/2002 | Miller et al. | 345/156 |
| 2002/0078107 A1 | * | 6/2002 | Miller et al. | 708/131 |
| 2002/0080150 A1 | * | 6/2002 | Nakatani | 345/660 |
| 2004/0083247 A1 | * | 4/2004 | Koont | 708/160 |

* cited by examiner

*Primary Examiner*—Sy D. Luu
(74) *Attorney, Agent, or Firm*—J. Dennis Moore; W. James Brady, III; Frederick J. Telecky, Jr.

(57) ABSTRACT

A graphing calculator having a user interface that allows the user to easily specify a mathematical function. The user interface allows the user to specify a constant function, a linear function, or a non-linear function in a simplified input format. The user interface can also be implemented on devices that have limited input and output capability. An embodiment of the present invention is a graphing calculator, which allows the user to easily input a population growth rate function. The user interface of the present invention calculator helps the student to more readily adjust a function and observe the result of the adjustment. Similarly, other embodiments include the same user interface functionality in a software application package that is executed on a computer or graphing calculator.

30 Claims, 6 Drawing Sheets

USER INTERFACE FOR GRAPHICAL SPECIFICATION OF FUNCTIONS

This application claims the benefit of Provisional application Ser. No. 60/231,351 filed Sep. 8, 2000.

TECHNICAL FIELD OF THE INVENTION

This invention relates to computer user interfaces, and more particularly to a user interface which allows the user to easily specify a mathematical function on a computer or handheld device. A preferred embodiment of the invention is directed to a user interface with a population growth rate function on a handheld device such as a graphing calculator.

BACKGROUND OF THE INVENTION

Electronic calculators and computers have become common tools for teaching students mathematics. Teachers need teaching tools for the computer and calculator that are easy for the novice user to quickly understand and use. An important part of these teaching tools is the user interface for the learning tools on the computer or calculator. A goal of the user interface is to allow the student to quickly learn the underlying mathematical concepts without being burdened by the complexity of the software tool.

In particular, the advantages of graphing calculators are being utilized in the classroom. Graphing calculators are characterized by a larger screen which permits graph and table displays. They have sophisticated programming capability. They often permit data transmission to other computing devices, directly or via a data storage medium, as well as data collection via various interface protocols. Particular calculator models are often designed for particular educational levels. For example, a calculator for middle school students might have less advanced features than one designed for older students. However, regardless of the level for which a calculator is designed, a continual goal in designing them is to provide a logical and easy to use interface with the restraints of a low resolution screen compared to the laptop or desktop computer.

SUMMARY OF THE INVENTION

This invention provides a user interface which allows the user to easily specify a mathematical function on a computer or handheld device. The interface allows the user to specify a constant function, a linear function, or a non-linear function in a simplified input format. The user interface can also be implemented on devices that have limited input and output capability.

An embodiment of the present invention is a graphing calculator user interface, which allows the user to easily input a mathematical function. The user interface of the present invention helps the student to more readily adjust a function and observe the result of the adjustment. Similarly, other embodiments include the same user interface functionality in a software application package that is executed on a graphing calculator.

The calculator in the present invention may otherwise be a conventional graphing calculator. Namely, the calculator screen is capable of two-dimensional displays and of displaying at least straight lines in any direction and a cursor. A key panel has keys at least capable of selecting items on the display screen and moving the cursor horizontally or vertically on said screen.

In an embodiment of the invention the user interface is specifically arranged to implement a population growth rate function. This interface allows a mathematical student to easily see and understand how the function changes affect the population growth rate.

DETAILED DESCRIPTION OF THE INVENTION

FIG. 1 illustrates a basic user interface to input a mathematical function in accordance with an embodiment of the present invention. In this section the invention is described in terms of a user interface for a computer or handheld device. However, the same interface could be described in terms of activities performed by the computer or steps to be performed by the user. For example, steps involving entry of data by the user could also be described as receipt of data by the computer or calculator. The present invention contemplates these various alternative forms of description for the novel ideas described herein for a computer interface. Some embodiments of the present invention are particularly directed to a computer interface for a handheld computing device, such as a calculator, organizer or planner where the input and output capabilities are limited.

FIGS. 1a–f illustrates a sequence of basic display screens for a user interface to input a mathematical function in accordance with an embodiment of the present invention. The interface 100 includes a graph area 102 having a grid of vertical (X value) and horizontal (Y value) lines. The graph typically has numerical values for each grid line. In the example shown, the increment for each line on the Y axis is 5, and the center value is zero. Next to the graph is a constant function input 104. In this embodiment, the constant function input is a vertical bar 104 with the same divisions as the graph.

The user defines a constant function of Y=by selecting a point on the constant function input bar 104. The computer or calculator then draws on the graph the corresponding constant function for the point chosen on the bar—a horizontal line on the graph at the vertical position of the point chosen on the bar. The user may select a point on the constant function input bar in any manner. Typically this is done by using an input device such as a mouse to move a cursor to the desired location. On other embodiments, it may be done with a stylus on a touch sensitive input screen.

Figure 1A:
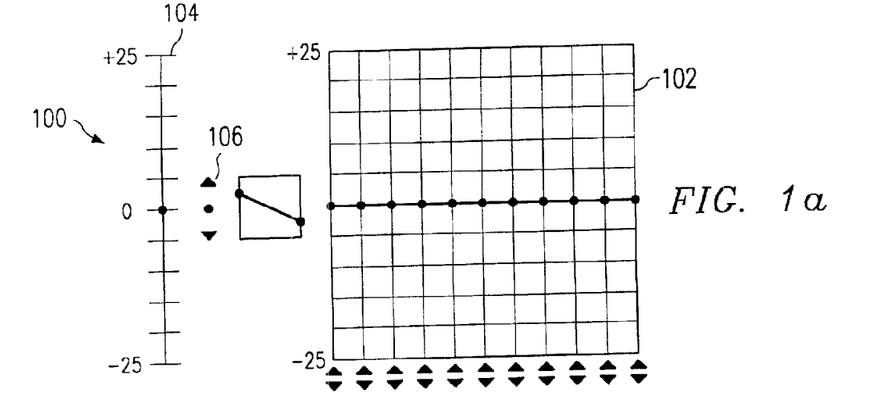
FIG. 1 illustrates a set of screen displays which allows the user to input a mathematical function according to an embodiment of the present invention.
Figure 1B:
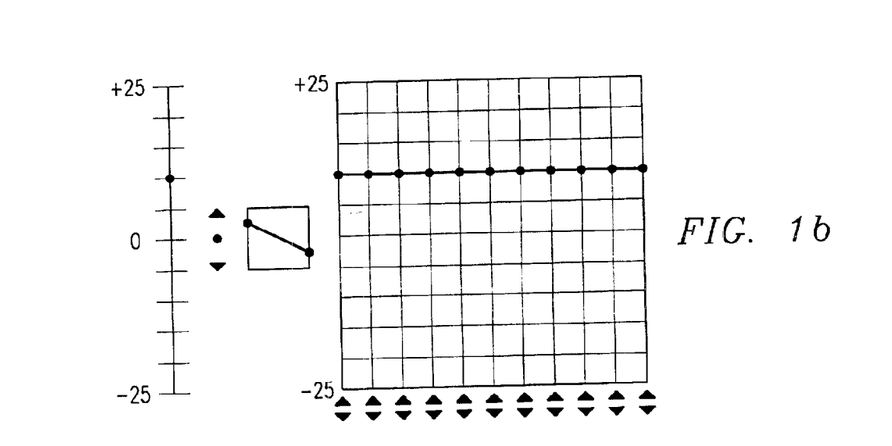
Figure 1C:
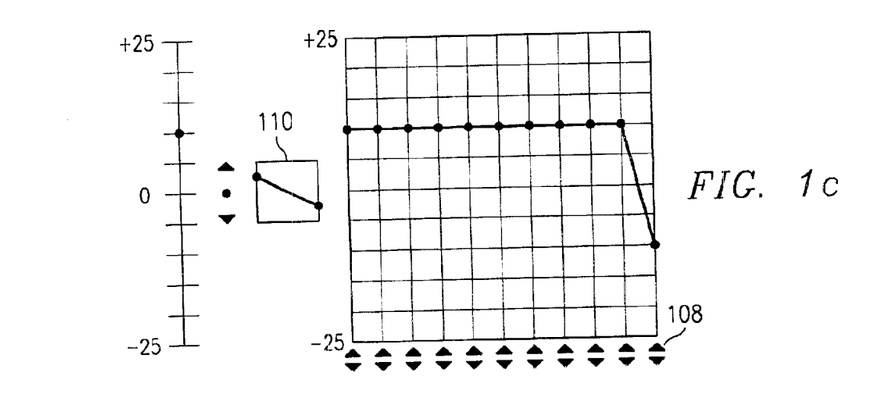
Figure 1D:
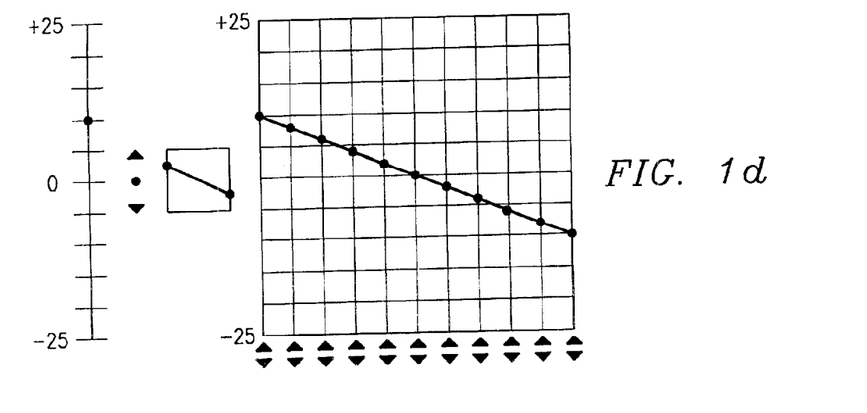
Figure 1E:
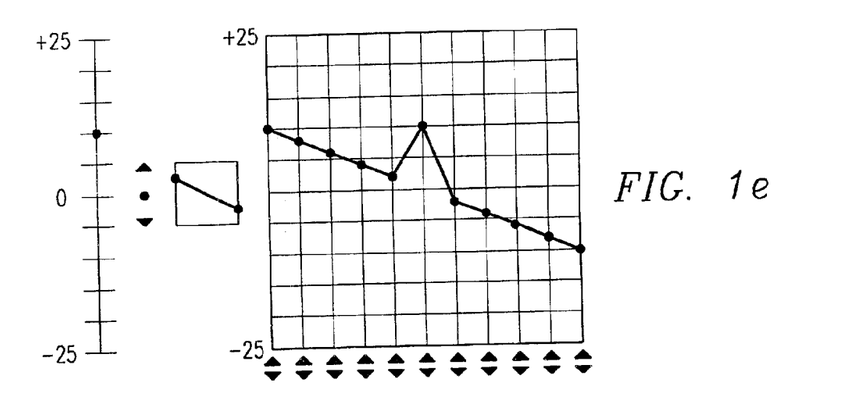
Figure 1F:
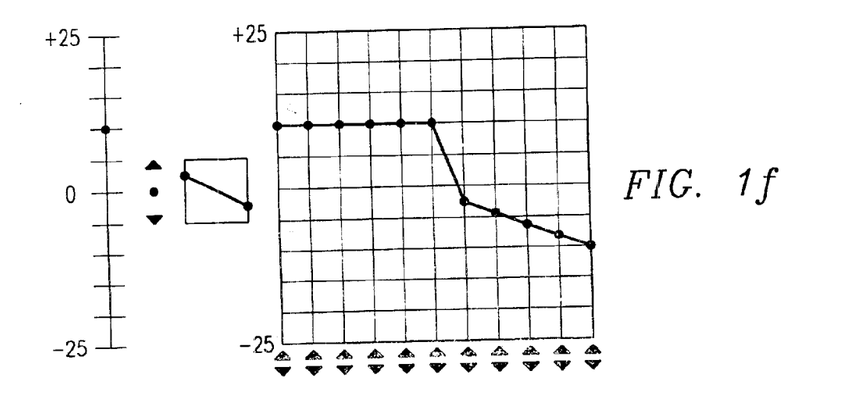

In the embodiment of FIG. 1a, the graph begins with the function of Y=0 as shown. If the user selects a point of Y=10, a line is drawn indicating the constant function as shown in FIG. 1b. The illustrated embodiment includes a constant function adjustment input 106. The adjustment input 106 includes up and down movement arrows to micro-adjust the constant function and a centering input point to move the constant function to a predetermined point; in this case the Y=0 line on the graph.

The user interface shown in FIG. 1 also allows the user to specify a linear function. A linear function is specified by first setting the end points on either side of the graph and then activating the linear function input 110. For example, in FIG. 1b the endpoints have both been moved to Y=10 using the constant function bar as described above. The right endpoint is then moved to −10 as shown in FIG. 1c. The endpoint can be moved in the same manner as described above for moving the point on the constant function input bar, i.e. Selecting a point on the right-most vertical line of the graph, or using the up and down movement arrows 108 at the bottom of the graph to micro-adjust the point. At this point, activating the linear function input 110 results in the graph display shown in FIG. 1d. In this embodiment, the linear function input is a display icon with a line through a box with the endpoints of the line shown at either side of the box. The linear input function may be activated by a cursor, stylus on a touch screen, or by a key input.

The user interface according to the embodiment of FIG. 1 also allows the user to input a non-linear function. The user interface allows the user to define a non-linear function by moving a point on each vertical line of the graph. Thus, the user is allowed to set Y values for discrete values of X, and the software defines the function for all point between those values using interpolation. The points are moved as described above, either by "clicking" on the point, or using the movement arrows 108. FIG. 1e shows the display after moving a single point of the linear function defined above to Y=10. After moving the input point on each of the second through fifth vertical points to Y=10, the display appears as shown in FIG. 1f.

In an embodiment of the present invention, the described inputs for constant function, linear function and non-linear function can be used at any time. For example, pressing the linear function icon input 110 from the display shown in FIG. 1f will restore the display to the function shown in FIG. 1d (the endpoints were not moved). Likewise, selecting a point on the constant function input bar will change the display to the selected constant function regardless of the current display.

FIG. 2 represents another embodiment of the present invention. This embodiment is directed to devices that have limited input and output display capability such as handheld calculators. This embodiment allows handheld devices to input the functions as described above on a limited display and without a mouse or stylus type input. The display 200 in FIG. 2 includes a graph area 202, and a function mode select area 204. The graph is as described above for the previous embodiment. The user is able to select which function mode is active by selecting one of three icons- constant function mode 206, linear function mode 208 and non-linear function mode 210. At this point, the up/down arrow keys can be used to move the cursor and select the desired function mode. The function mode icon is shown in inverse video (see item 208 of FIG. 2a) to indicate which function mode will be selected. Mode selection can be activated with a command or specific key stroke. One of the three modes is shown to be currently active with the function mode indicator 212.

Figure 2A:
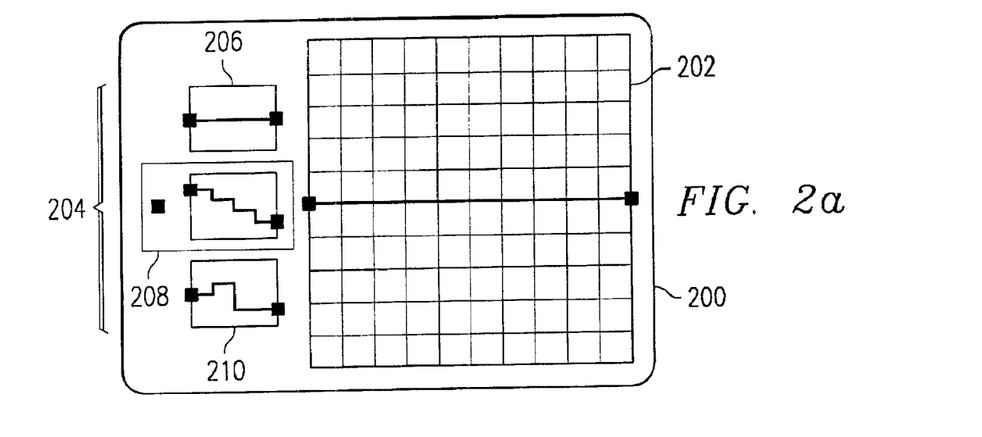
FIG. 2 illustrates another set of screen displays which allows the user to input a mathematical function according to another embodiment of the present invention.
Figure 2B:
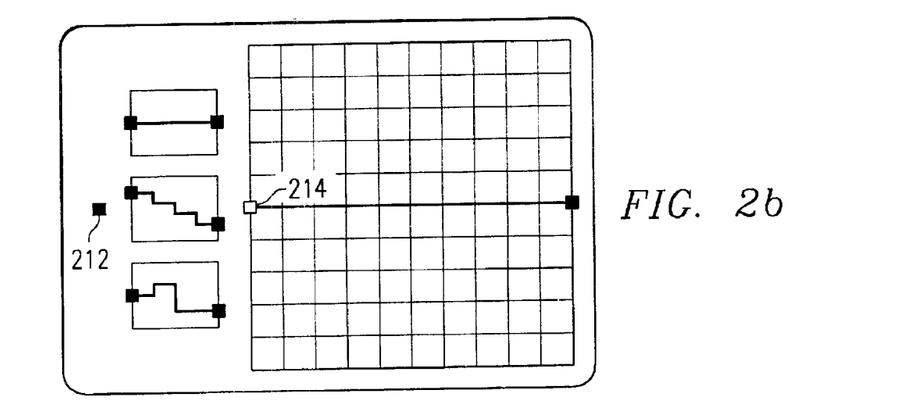
Figure 2C:
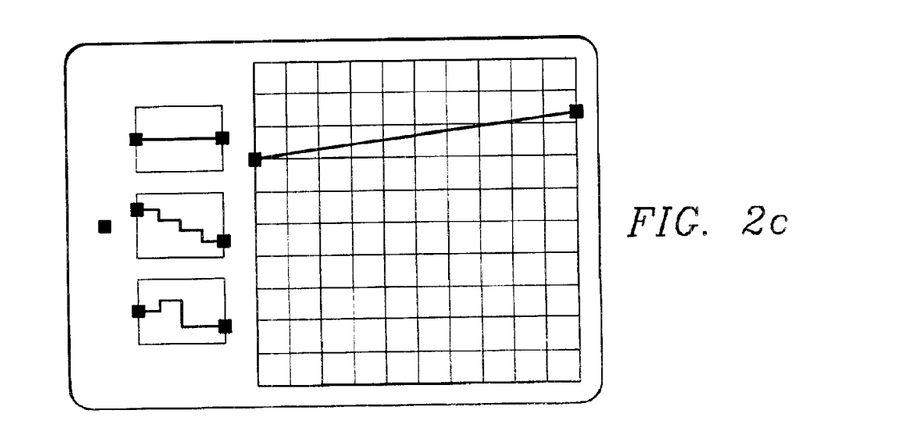

FIG. 2b shows the user interface after selection of the linear function icon 208 as indicated by the mode indicator 212. The linear function can be defined by moving the endpoints of a line on the graph to the desired vertical positions. The first endpoint to be moved is shown as a box 214. The box indicates which point is under current control. At this point, the user interface will move the indicated endpoint in response to the up/down arrows. The left point is shown moved two units up in FIG. 2c. The user can then press the right arrow key to move the box to the right point, and then use the up/down arrows to select the location for the second point of the linear function. FIG. 2c shows the linear function after moving both endpoints as described herein.

Figure 2D:
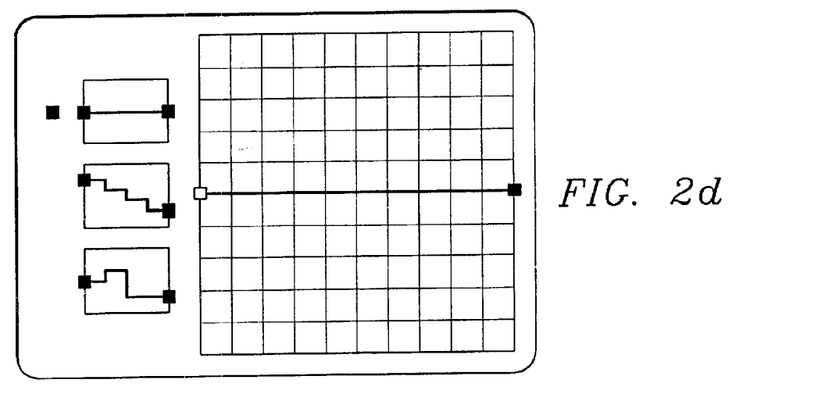
Figure 2E:
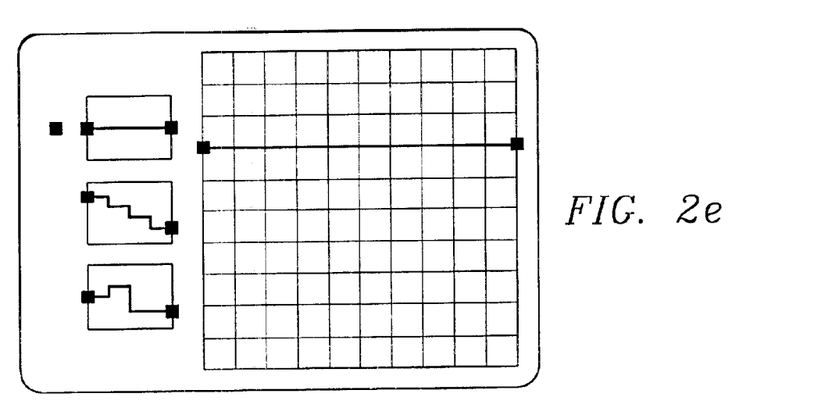

FIG. 2d shows the user interface after selection of the constant function icon 206 as indicated by the mode indicator. The constant function can be defined by moving the left endpoints of a line on the graph to the desired vertical positions. The left endpoint is shown as a box 214. At this point, the user can move the constant function up or down using the up/down arrow keys. FIG. 2e shows the constant function after moving the endpoints upwards.

Figure 2F:
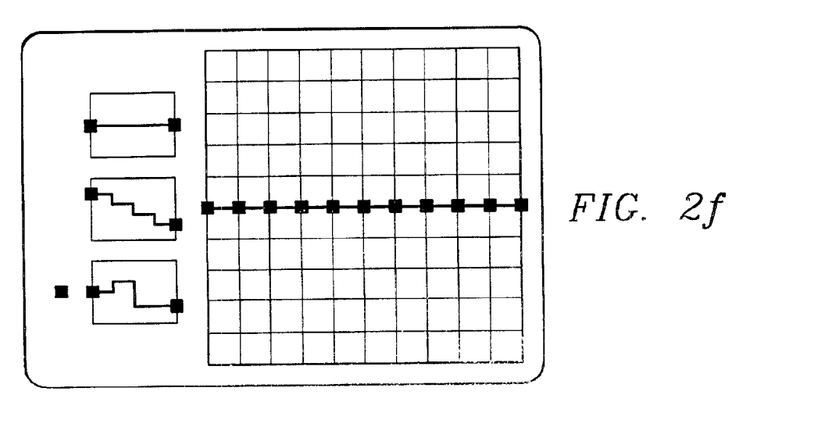
Figure 2G:
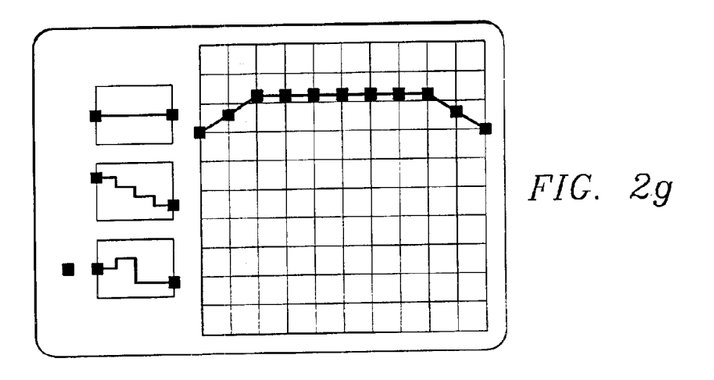

FIG. 2f shows the user interface after selection of the non-linear function icon 206 as indicated by the mode indicator. The user interface allows the user to specify a non-linear function by moving each of the points of a line on the graph to the desired vertical positions. FIG. 2f shows the display after entering the non-linear function mode. Initially, each of the vertical lines has a point on the middle Y=line that can be positioned by the user. At this point, the user can select any of the points using the left/right arrows, and move the point up or down using the up/down arrow keys. FIG. 2g shows a possible non-linear function after moving the points.

Figure 3:
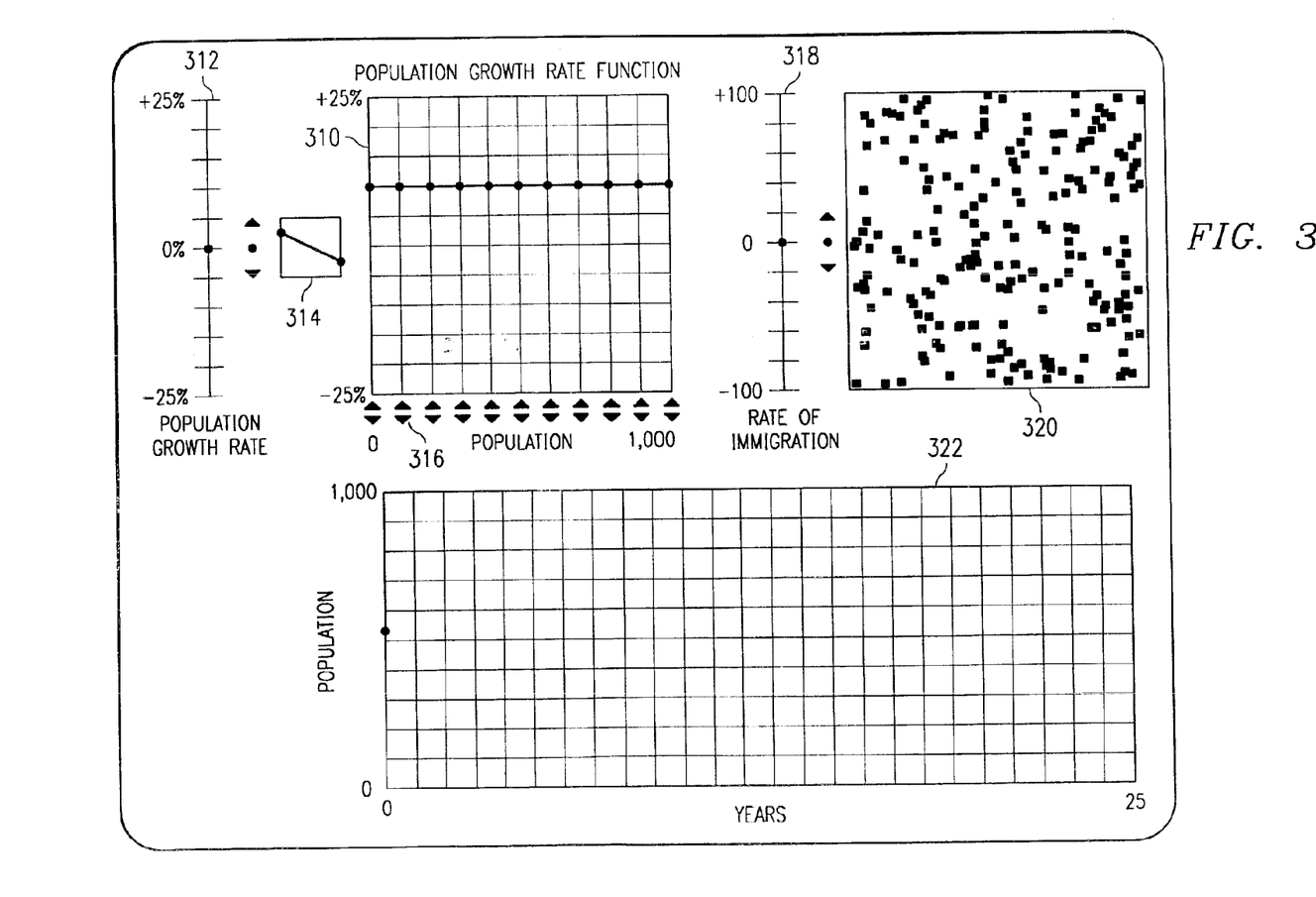
FIG. 3 illustrates a user interface for entering a population growth rate function according to another embodiment of the present invention.

FIG. 3 illustrates another embodiment of the present invention. This embodiment is a user interface for designating a mathematical function for a particular type of problem—a model of population growth. The function controls of the user interface enable the user to set up a model of the population growth of a particular species in a particular habitat. This embodiment includes a graph 310 for the population growth rate function, a constant function input bar (population growth rate) and adjustment 312, a linear function input icon 314, and point adjustment arrows 316 as describe in previous embodiments. This embodiment further includes a rate of immigration input bar 318, a habitat box 320, and a population growth graph 322.

The user interface shown in FIG. 3 is set up and operated as described in the following paragraphs to model a single species in a habitat. Other variations of the user interface can be made to model multiple species.

This embodiment of the growth rate model uses a constant rate of immigration or emigration. By clicking on the immigration bar 318, the user can set the rate of immigration to be anywhere between +100 individuals per year and −100 individuals per year. Negative numbers indicate emigration or harvesting. The user can choose a constant growth rate of between +25% per year and −25% per year by clicking on the population growth rate bar 312 at the left of the graph 310. As described above, the set of controls just to the right of the constant growth rate scale and the immigration and emigration scale can be used to set these two constants precisely. The small circular button sets the corresponding constant to zero. The up and down arrows raise or lower the corresponding constants one step at a time.

Since the population growth rate is usually a function of the population, the user interface allows the user to enter a non-constant function for the population growth rate. The user can enter a function for the growth rate as described above for the previous embodiments. To enter a function, the user may click on each of the vertical lines to set the population growth rate for the corresponding population. For example, clicking along the leftmost vertical line sets the population growth rate when the population is zero; clicking along the next vertical line sets the population growth rate when the population is 100; and clicking along the rightmost vertical line sets the population growth rate when the population is 1,000. As the user clicks on each vertical line, a dot will move to indicate the value set. At the same time the dots are connected by lines to indicate the population growth rate at intermediate populations. The user can fine tune the function by clicking the up and down arrows underneath each vertical line.

A shortcut enables the user to use a linear function for the relationship between population and population growth rate. The user can click along the leftmost vertical line to set the population growth rate when the population is zero. Then click along the rightmost vertical line to set the population growth rate when the population is 1,000. Then the user can click the linear input 314 to specify the linear function determined by the two values just set.

The user can investigate the predictions made by executing the model and using the model population graph. The user first must choose an initial population by clicking along the left edge of the population graph 322 at the desired initial population level. The user interface will show the corresponding number of individuals appear in the "habitat" 320. The user can then execute the model by hitting an appropriate key or input. The user interface will then apply the function and immigration values to the initial population and output the population growth to the habitat 320 and population graph 322.

Figure 4:
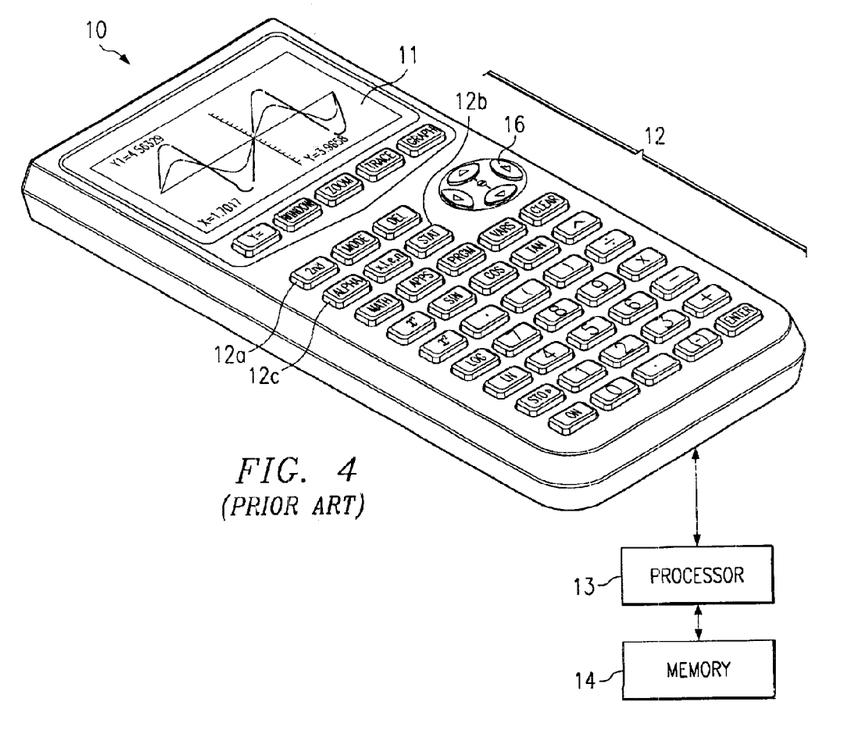
FIG. 4 illustrates the front panel of a prior art calculator 10 that allows the user to input a mathematical function according to an embodiment of the present invention.

FIG. 4 illustrates the front panel of a calculator 10, which incorporates the features of the present invention. Calculator 10 is described herein in terms of particular software and hardware features of the TI-83+, a commercially available graphing calculator manufactured by Texas Instruments Incorporated. Apart from the features of the present invention, many of the features of calculator 10 described herein are typical of graphing calculators, while other features are unique to the TI-83+ "family" of TI calculators. The use of the TI-83+ is for purposes of description, and does not limit the invention. The features that are the subject of the present invention could be incorporated into other calculators that provide graphical displays, or they could be incorporated into other computer based teaching tools and handheld computers.

In FIG. 4, the screen 11 of calculator 10 has a "graphical display", as that term is used herein. In addition to the ability to draw graphical displays of various types, some of the software features of calculator 10 include software applications loading and storage, and keystroke programming. It also permits data collection, display and analysis.

Various hardware features include a large pixel screen 11 which is 64×94 pixels. A keypad 12 has various keys for data and command entry, some of which are used to implement the invention and are described herein. The calculator includes a processor 13 connected to a memory unit 14 a 32K byte RAM and 512K byte application space. Other features are an I/O port for data linking, and a unit-to-unit link cable connection capability.

As is typical of calculators, calculator 10 has a secondary function key, 2nd key 12a, which permits other keys to have two functions. For example, by pressing 2nd key 12a and then STAT/LIST key 12b, the calculator performs the LIST function. For simplicity of explanation herein, a key having two functions is referred to in terms of the function appropriate for the context, i.e., when discussing the LIST function, the STAT/LIST key 12b is referred to as the LIST key 12b. Similarly, calculator 10 has an Alpha key 12c, which when depressed makes the other keys subsequently depressed to input an alpha character.

Other Embodiments

Although the present invention has been described in detail, it should be understood that various changes, substitutions, and alterations could be made hereto without departing from the spirit and scope of the invention as defined by the appended claims.

What is claimed is:

1. A handheld computer device having a user interface to input a mathematical function comprising:
   a screen capable of displaying mathematical functions and a cursor;
   an input device capable of selecting positions of said cursor and moving said cursor horizontally or vertically on said screen;
   a processor for executing programming that provides a user interface comprising:
   a graph having horizontal and vertical lines,
   a constant function input for designating a horizontal constant function and an input point to move the constant function up and down on the graph, a linear mode input to select a linear function between two input points, at either side of the graph, and wherein the two input locations are movable up and down the graph based on user input.

2. The device of claim 1, wherein said constant function input is a vertical line to the side of the graph with horizontal marks coinciding with the horizontal lines of the graph wherein a constant function is represented on the graph at a point indicated on the vertical line by the user.

3. The device of claim 2, wherein said constant function input further comprises up and down movement arrows to adjust the constant function and a centering input point to move the constant function to a predetermined point.

4. The device of claim 1, further comprising a non-linear mode to select a non-linear function.

5. The device of claim 1, further comprising adjustment arrows associated with a plurality of vertical lines of the graph which move the linear function input points up and down.

6. The device of claim 1, further comprising adjustment arrows associated with a plurality of vertical lines of the graph which move the linear and at least one non-linear function input point up and down.

7. The device of claim 1, wherein the input points of the constant function and the linear function move up and down in response to a mouse cursor.

8. The device of claim 1, wherein the input points of the constant function and the linear function move up and down in response to a touch screen input.

9. The device of claim 1, wherein activation of the linear mode select input draws a line representing the function between the position of the two points on either side of the graph.

10. The device of claim 1, wherein the constant function input is an icon that can be selected and the constant function input point is moved up and down with arrow keys of the input device.

11. The device of claim 1, wherein the linear function input is an icon that can be selected and the linear function input points are moved up and down with the arrow keys.

12. The device of claim 1, wherein the user interface further comprises a rate of immigration function bar and a population graph.

13. The device of claim 1, wherein the constant function input is a vertical line to the side of the graph with horizontal marks coinciding with the horizontal lines of the graph wherein a constant function is represented on the graph at a point indicated on the vertical line by the user, and the constant function input further comprises up and down movement arrows to adjust the constant function and a centering input point to move the constant function to a predetermined point.

14. The device of claim 12 wherein the user interface further comprises
    arrows below a plurality of vertical lines of the graph which move the constant function and the linear function input points up and down,
    a rate of immigration function bar and
    a population graph.

15. A software product stored on a computer readable medium providing instructions to generate a user interface comprising:
    a) a graph having horizontal and vertical lines,
    b) a constant function input for designating a horizontal constant function and an input point to move the constant function up and down on the graph, and
    c) a linear mode input to select a linear function between two input points, at either side of the graph, and wherein the two input locations are movable up and down the graph based on user input.

16. The software product of claim 15, wherein said constant function input is a vertical line to the side of the graph with horizontal marks coinciding with the horizontal lines of the graph wherein a constant function is represented on the graph at a point indicated on the vertical line by the user.

17. The software product of claim 16, wherein said constant function input further comprises up and down movement arrows to adjust the constant function and a centering input point to move the constant function to a predetermined point.

18. The software product of claim 15, wherein said user interface further comprises adjustment arrows associated with a plurality of vertical lines of the graph which move the constant function and the linear function input points up and down.

19. The software product of claim 15, wherein said user interface further comprises adjustment arrows associated with a plurality of vertical lines of the graph which move the linear and at least one non-linear function input point up and down.

20. The software product of claim 15, wherein the input points of the constant function and the linear function move up and down in response to a mouse cursor.

21. The software product of claim 15, wherein the input points of the constant function and the linear function move up and down in response to a touch screen input.

22. The software product of claim 15, wherein activation of the linear mode select input draws a line representing the function between the position of the two points on either side of the graph.

23. The software product of claim 15, wherein the user interface further comprises a rate of immigration function bar and a population graph.

24. The software product of claim 15, wherein the constant function input is a vertical line to the side the graph with horizontal marks coinciding with the horizontal lines of the graph wherein a constant function is represented on the graph at a point indicated on the vertical line by the user, and the constant function input further comprises up and down movement arrows to adjust the constant function and a centering input point to move the constant function to a predetermined point.

25. The software product of claim 24 wherein the user interface further comprises
    arrows below a plurality of vertical lines of the graph which move the constant function and the linear function input points up and down,
    a rate of immigration function bar and a population graph.

26. A software product for storage on a handheld computer readable medium, to generate a user interface comprising:
    a) a graph having horizontal and vertical lines,
    b) a constant function input for designating a horizontal constant function and an input point to move the constant function up and down on the graph,
    c) a linear mode input to select a linear function between two input points, at either side of the graph, and wherein the two input locations are movable up and down the graph based on user input, and
    d) a non-linear input mode to select a non-linear function.

27. The software product of claim 26 wherein said constant function input further comprises up and down movement arrows to adjust the constant function.

28. The software product of claim 26, wherein said user interface further comprises adjustment arrows associated with a plurality of vertical lines of the graph which move the linear and at least one non-linear function input point up and down.

29. The software product of claim 26, wherein the input points of the constant function and the linear function move up and down in response to a touch screen input.

30. The software product of claim 26, wherein activation of the linear mode select input draws a line representing the function between the position of the two points on either side of the graph.

* * * * *